US005167482A

United States Patent [19]

Cross

[11] Patent Number: 5,167,482

[45] Date of Patent: Dec. 1, 1992

[54] METHOD FOR ROBOTIC ACQUISITION OF ELECTRICAL WIRES

[75] Inventor: Dan A. Cross, Seattle, Wash.

[73] Assignee: The Boeing Company, Seattle, Wash.

[21] Appl. No.: 722,799

[22] Filed: Jun. 28, 1991

Related U.S. Application Data

[62] Division of Ser. No. 933,958, Nov. 24, 1986, abandoned.

[51] Int. Cl.[5] .............................................. B25J 15/00

[52] U.S. Cl. ...................................... 414/786; 29/453; 294/99.1; 901/39; 414/225

[58] Field of Search ............... 414/729, 730, 786, 225; 294/99.1, 86.4; 29/453, 747, 748, 857; 901/6, 31, 39

[56] References Cited

U.S. PATENT DOCUMENTS 3,845,535 11/1974 Over .................................... 29/56.6
4,094,212 6/1978 Hyams ........................... 294/99.1 X
4,520,966 6/1985 Bloch et al. ...................... 242/54 R
4,593,452 6/1986 Keahey et al. .................... 29/857 X
4,677,734 7/1987 Bloch et al. ........................ 29/564.2

FOREIGN PATENT DOCUMENTS 1256146 2/1961 France ............................... 269/902
768634 11/1980 U.S.S.R. ............................ 294/99.1

*Primary Examiner*—Michael S. Huppert
*Assistant Examiner*—Donald W. Underwood
*Attorney, Agent, or Firm*—John C. Hammar

[57] ABSTRACT

A wire guide includes a notch cut in one face and a plurality of spaced webs oriented transversely in the notch to define a predetermined line for the wire at the bottom of a V-shaped valley fabricated into the webs. The webs support the wire so that a robot tool, having notches corresponding to the webs, can align with the webs along the line and can descend into the notches of the guide to acquire the wire in a retaining groove.

11 Claims, 1 Drawing Sheet

FIG. 1
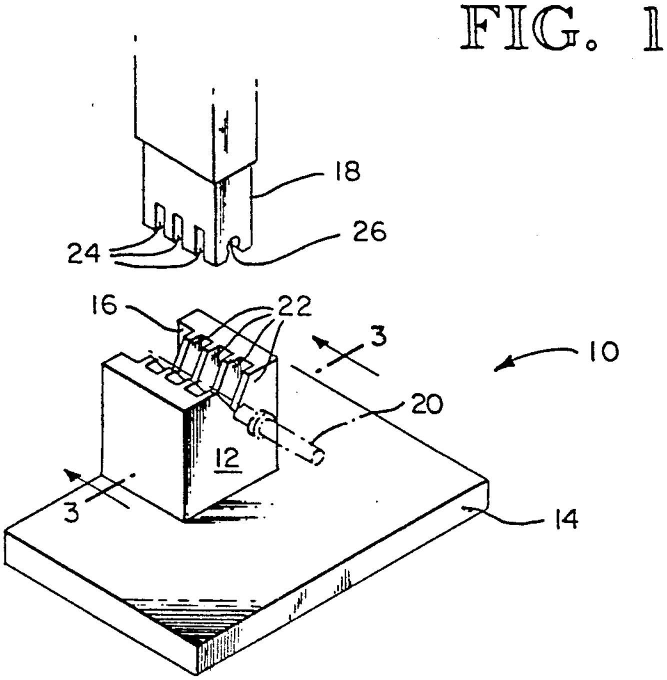
FIG. 2
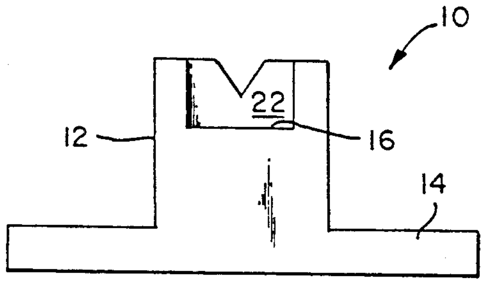
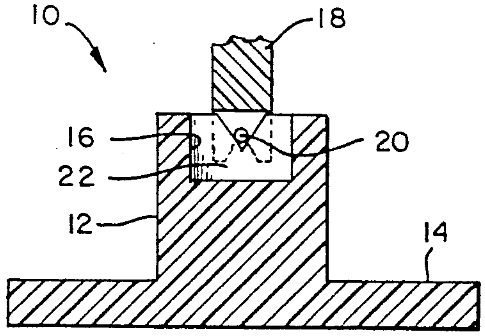
FIG. 3
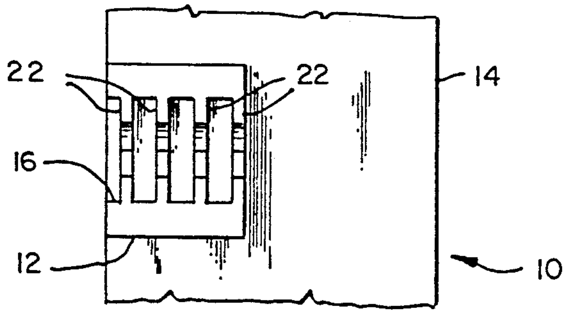
FIG. 4

METHOD FOR ROBOTIC ACQUISITION OF ELECTRICAL WIRES

GOVERNMENT RIGHTS

The United States Government has rights in this invention pursuant to Contract No. DAAH01-82-D-0013 awarded by the U.S. Army.

REFERENCES TO RELATED APPLICATIONS

The present application is a divisional application based upon U.S. patent application Ser. No. 06/933,958, filed Nov. 24, 1986, now abandoned.

TECHNICAL FIELD

The present invention relates to a method of using a wire guide that is designed to allow a robot to acquire an electrical wire reliably. The guide is a component in a robotic wire harness assembly system. It receives a free end of a wire, and positions the end accurately for acquisition by a robot.

BACKGROUND ART

Wire harnesses are customarily assembled by hand since the routing of wires is complicated, must be done precisely, and each wire must be marked individually and uniquely. Recently, as described in U.S. Pat. No. 4,520,966 and U.S. Pat. No. 4,677,734, The Boeing Company has developed a robotic wire harness assembly system to reduce the labor intensity of the wire harness assembly process. Boeing robotic system selects and measures each wire segment in the harness serially, marks each wire, and usually configures the ends of each wire with appropriate termination devices prior to to laying the wire into its unique position in the harness with a formboard layup robot. This layup robot must acquire (hold) one end of the electrical wire with a suitable tool and convey the wire into its location in the harness. To allow the robot to acquire the wire reliably, the guide of the present invention was developed. The guide positions the wire end (which has a residual curl) in a predetermined position (or known volume) where it can be acquired reliably by the robot.

SUMMARY OF THE INVENTION

The wire guide of the present invention provides for the predetermined positioning of one free end of an electrical wire of any common size (for wire harness use) and allows the foot of a layup robot to acquire the wire simply and reliably. The guide preferably includes a base or block to position the guide accurately and precisely in a predetermined, stable position. A notch is cut into one face of the block and extends to a uniform depth across the length of the block. A pluralty of substantially uniform V-shaped webs are transversely arranged in substantially parallel spaced array across the width of the notch. The valley of each web descends into the notch substantially a predetermined distance which is less than the depth of the notch.

When a wire is placed in the throat of the notch, and, accordingly on the webs of the block, it will be curled in the valley along the bottom of the valley. There, a robot foot can acquire the wire by pushing the wire to the bottom of the valley defined by the webs while positioning corresponding notches cut into its foot in alignment with the webs. Lowering the foot causes tines or fingers (defined by the foot's notches) on the foot to descend deeper into the notch of the block, and causes the wire end (which is supported on the webs and which is pushed to the bottom of the V) to be pushed into a retaining groove of the foot, where it is held for layup. A portion of each finger extends downwardly into the guide to a depth below the deepest apex, i.e., valley of the webs.

Other features of the method and apparatus of the present invention will be more apparent from the detailed description and supporting drawings.

BRIEF DESCRIPTION OF THE DRAWINGS

FIG. 1 is an isometric of the wire guide of the present invention and its associated robot foot.

FIG. 2 is a side elevation of the guide of FIG. 1.

FIG. 3 is a sectional view of the guide of FIG. 1, taken generally along line 3—3, but having the robot foot lowered to the depth at which the foot acquires the wire.

FIG. 4 is a top plan view of the guide illustrated in FIG. 1.

BEST MODE CONTEMPLATED FOR MAKING AND USING THE INVENTION

The wire guide 10 of the present invention preferably has a raised block 12 extending from a stabilizing base 14. The base 14 includes one or more pins (not shown) that allow the guide 10 to be accurately positioned. Accurate positioning is important so that a layup robot can be trained as to the precise location of the block 12, and can acquire a wire end reliably from the guide 10, as will be explained. In many circumstances the base 14 is unnecessary and stability for the block 12 can be achieved through other means.

The block 12 includes a longitudinal notch or groove 16 generally cut into the block 12 along its top face and extending at least as wide as the foot 18 of the tool which acquires the wire 20 from the layup robot. Generally, the notch 16 is rectangular in side elevation, as shown in FIG. 2, but other shapes can be used so long as the foot 18 can descend into the notch an adequate depth to acquire the wire 20.

A plurality of webs 22 are arranged in substantially parallel, spaced array transversely across the notch 16. Each web 22 includes a V-shaped valley, with the valley of each web defining a substantially straightline extending the length of the block 12. The valleys descend into the block 12 a distance which is less than the depth of the notch 16. As shown in FIG. 3, the foot 18, which includes a plurality of spaced transverse grooves or notches 24 corresponding to the webs 22 can be lowered to descend into the block 16 with fingers or digits of the foot 18 interleaving with the webs 22. In this way, the wire 20, which rests somewhere in the valley, is forced onto the line defined by the bottom of the valleys of the webs and, thereafter, into a longitudinal retaining groove 26 of the foot 18, and remains in the retaining groove 26 when the foot 18 is raised from the block 16. The webs 22 are substantially as wide as the corresponding transverse grooves 24 and the spaces between webs 22 are substantially as wide as the corresponding width of the fingers on the foot 18. Any spacing can be used, but typically, the webs are all substantially similar in width and the spacing is uniform. Several webs 22 are required to provide sufficient alignment guidance and support for the wire 20, which must be snapped through a constriction in the foot into the retaining groove 26. The flexibility of the wire and the dimensions of the foot 18 dictate the number of webs 22 and their arrangement. The foot is usually wider than the width of the throat of the guide (i.e. wider than the top of the "v")

As shown in FIG. 1, the guide 10 is a unitary construction of durable, nonconductive nylon that has been machined to include the notch 16 and webs 22 in the top face. The guide 10 could also be made by molding, and could be made in several parts. For example, the webs 22 might be separable plates that seat in the notch 16 in retaining slots on the edges of the notch 16.

All the webs 22 should have the same general configuration so that the wire 20 can be positioned at a predetermined depth within the guide 10 along a straight line in the plane including the wire 20 and the longitudinal retaining groove 26 of the foot 18. As shown, each web 22 is identical, but this is only preferred. It is more important that the webs extend to a uniform depth than that they have uniform pitches for their sloping sides The webs provide the desired predetermined alignment for the wire end.

Interchangeable webs 22 might make the guide 22 more versatile both in applications for robots of differing kinds or for wires of differing sizes. For most applications, however, the V-block design that is shown (i.e., one with permanent, fixed webs) will be usable for all wire sizes that are common for wire harness assemblies. A steep pitch is preferred because the steep slope tends to stabilize the wire at the bottom of the valley and to set the proper alignment to a closer variance between webs. The mouth of the "V" should remain reasonably wide, however, to allow easy placement of wire into the guide.

Instead of spaced webs, the guide might include a unitary raised, central V-block segment with cutaway ends and the foot may have widely spread tines or fingers only at the ends. The web construction that is shown, however, has proven to be versatile and reliable both in acquisition of the wire and its retention in the foot. Small widths for the foot's grooves (as shown) are preferred.

The wire 20 can be manually positioned in the notch 20, but, more commonly, will be placed there by a robot. The converging valley design allows the robot to have a greater tolerance in this positioning step while allowing the high precision task of acquisition by the foot 18 to be easily performed. Accordingly, the pitch of the webs should be adequate to define a mouth of the V that allows a robot to feed wires reliably to the guide for acquisition by the foot. Because the wire end retains a natural curl, it will not generally align initially along the bottom of the valley, but it will be forced there by the descending foot of the robot.

The webs are usually nylon, but they can be made of any material that does not damage the insulation of the wire during its acquisition. The preferred webs are nonconductive, but could be metal.

The natural curl of the wire causes the free end of the wire to assume too widespread a variety of positions for robotic acquisition unless a wire guide is used. The diversity of positions simply cannot be tolerated by a robot, which operates within a narrow window of trainable movement. The guide confines the wire end to a precise spatial position in which the robot can always locate, align, and acquire the wire.

While preferred embodiments of the invention have been shown and described, those skilled in the art will readily recognize variations, modifications, or alterations of the invention that might be made to the preferred embodiments without departing from the inventive concept. The description and drawings are meant to illustrate the invention and not to limit it. The claims should be construed liberally in light of the description and drawings to protect the invention, its preferred embodiments, and its full range of equivalents. The claims should only be limited as is necessary in view of the pertinent prior art.

I claim:

1. A method for acquiring a wire with a tool on a robot, comprising the steps of:

(a) orienting the wire generally along a predetermined line by positioning the wire in the valley of a V-block wire guide, the guide having at least one, traverse V-shaped web, the "V" of the web defining an apex at its lowest point;

(b) supporting the wire on the web;

(c) lowering the robot tool in a plane including the line, the tool including a longitudinal groove, a mouth leading from a foot of the tool to the groove, and at least two fingers on each side of the groove to define the mouth, the fingers being longitudinally spaced by at least a distance equal to the thickness of the transverse web to define a transverse notch;

(d) snapping the wire into the groove on the tool by lowering the tool into the guide to align the notch with the web and to confine the wire in the mouth of the tool; and (e) raising the tool with the wire retained in the groove.

2. The acquisition method of claim 1 wherein, when snapping the wire into the groove, a portion of each finger extends downwardly into the guide to a depth below the apex of the web.

3. The acquisition method of claim 1 wherein the guide has a plurality of spaced transverse webs each having an apex so that the apexes of all the webs define the predetermined line and wherein the tool has a plurality of corresponding transverse notches defined by a plurality of spaced fingers so that when the tool is lowered into the guide the fingers of interdigitate with the webs.

4. The acquisition method of claim 3 wherein, when snapping the wire into the groove, a portion of each finger extends downwardly into the guide to a depth below the deepest apex of the webs.

5. The acquisition method of claim 4 wherein the transverse notches of the tool intersect with the longitudinal groove.

6. The acquisition method of claim 4 wherein the apexes of the guide webs are at a common, substantially equal depth within the guide.

7. The acquisition method of claim 1 wherein the guide is mounted on a stabilizing base having an area significantly larger than the "V" of the guide so that the guide remains steady during the acquisition of the wire by the robot tool.

8. The acquisition method of claim 2 wherein the webs are substantially equally spaced to support the wire relatively uniformly in the guide.

9. The acquisition method of claim 8 wherein the apexes of the webs are at a common, substantially equal depth within the guide so that the tool contacts the wire and acquires the wire substantially simultaneously along the length of the tool.

10. The acquisition method of claim 1 wherein the tool is lowered substantially perpendicular to the predetermined line.

11. The acquisition method of claim 1 wherein the tool travels in substantially a straight line into the guide when acquiring the wire and when rising out from the guide.

* * * * *